United States Patent
Baca et al.

(10) Patent No.: US 9,646,216 B2
(45) Date of Patent: May 9, 2017

(54) MULTIPLE USER BIOMETRIC FOR AUTHENTICATION TO SECURED RESOURCES

(71) Applicant: Intel Corporation, Santa Clara, CA (US)

(72) Inventors: Jim S. Baca, Corrales, NM (US); Arjun M. Karpur, Chandler, AZ (US); Dhaval R. Patel, Charlotte, NC (US); Preetham M. Shambhat, Los Angeles, CA (US); Naissa Conde, Atlanta, GA (US); Prital B. Shah, Chandler, AZ (US); Anavai G. Ramesh, Chandler, AZ (US); Tobias M. Kohlenberg, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 130 days.

(21) Appl. No.: 14/563,140

(22) Filed: Dec. 8, 2014

(65) Prior Publication Data

US 2016/0162671 A1 Jun. 9, 2016

(51) Int. Cl.
*G06K 9/00* (2006.01)
*G06F 21/32* (2013.01)

(52) U.S. Cl.
CPC ......... *G06K 9/00892* (2013.01); *G06F 21/32* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,900,052 B2 * | 3/2011 | Jonas | ................ | G06F 17/30477 713/153 |
| 8,804,954 B2 * | 8/2014 | Garnier | ................... | G06F 21/32 380/44 |
| 9,094,211 B2 * | 7/2015 | Klevan | ................. | H04L 9/3231 |
| 9,106,693 B2 * | 8/2015 | Quinlan | ............. | H04L 63/1408 |
| 2010/0153738 A1 | 6/2010 | Jonas | | |
| 2013/0103951 A1 * | 4/2013 | Klevan | ................. | H04L 9/3231 713/186 |
| 2013/0227651 A1 | 8/2013 | Schultz et al. | | |
| 2014/0139318 A1 | 5/2014 | Malpani et al. | | |
| 2015/0363586 A1 * | 12/2015 | Klevan | ................... | G06F 21/32 726/19 |

(Continued)

FOREIGN PATENT DOCUMENTS

KR 1020090113141 10/2009

OTHER PUBLICATIONS

International Search Report and Written Opinion received for PCT Patent Publication No. PCT/US2015/061816, mailed Apr. 22, 2016, 17 pages.

*Primary Examiner* — Anand Bhatnagar

(57) ABSTRACT

Various embodiments are generally directed to the provision and use of multiple person biometric authentication systems. An apparatus including a processor element and logic executable by the processor component is disclosed. The logic is configured to cause the apparatus to receive information including an indication of a plurality of biometric measurements and generate a combined biometric indicator based in part on the plurality of biometric measurements. The combined biometric indicator can be generated using fuzzy hashing techniques.

25 Claims, 8 Drawing Sheets

(56) References Cited

U.S. PATENT DOCUMENTS

2016/0028545 A1* 1/2016 Klevan ................ H04L 9/3231
 713/186
2016/0105285 A1* 4/2016 Jakobsson ............. H04L 9/3231
 713/186

* cited by examiner

MULTIPLE USER BIOMETRIC FOR AUTHENTICATION TO SECURED RESOURCES

TECHNICAL FIELD

Embodiments described herein generally relate to security and authentication, and particularly to biometric authentication.

BACKGROUND

Biometric authentication uses physiological and behavioral characteristics for identification and access control. For example, a human fingerprint, voice, face, or the like may serve as an access key to a computer system or a secured area. In general, biometric authentication systems include a biometric sensor to receive a biometric measurement from an entity to be authenticated and a system to compare the received biometric measurement to a stored key. For example, a fingerprint sensor can receive a fingerprint and the system can authenticate the received fingerprint against a stored fingerprint. As another example, facial recognition may be applied to an image received from a camera to identify and authenticate a user.

Many systems do not have multiple biometrics sensors. Additionally, typical facial recognition techniques can only detect a single user at a time. As such, authenticating multiple users may be difficult. As will be appreciated, however, some system access protocols require multiple parties to be present before access is granted. As such, ensuring all necessary parties are present and authenticated is complicated, unreliable, and potentially unsecure. It is with respect to these and other considerations that the embodiments described herein are needed.

DETAILED DESCRIPTION

Figure 1:
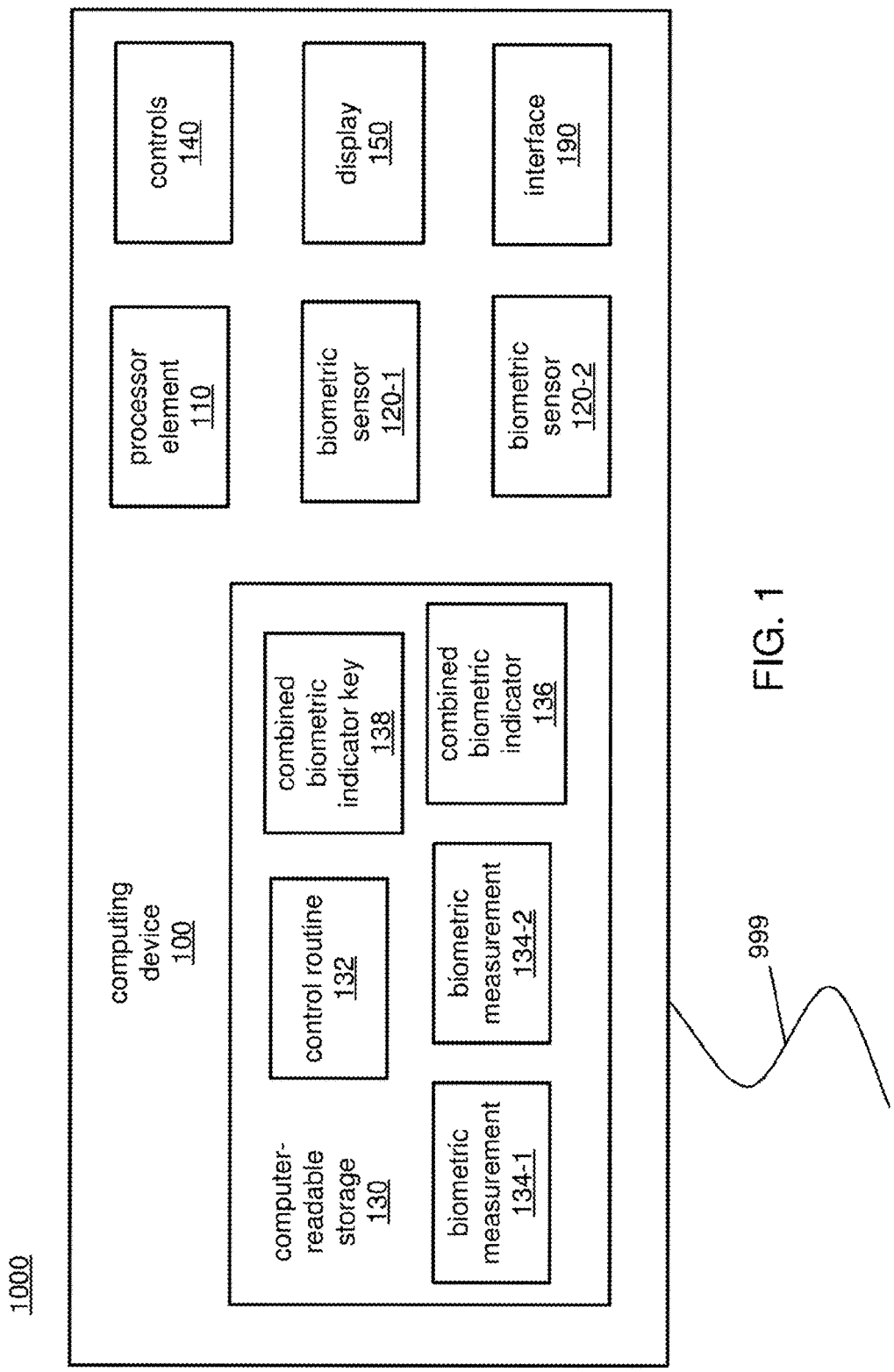
FIGS. 1-2 are block diagrams illustrating interactions among computing devices of a biometric authentication system.

Various embodiments are generally directed to the provision and use of multiple user biometric authentication systems. The system can be implemented with a single biometric sensor or multiple biometric sensors. Information is received from the biometric sensor(s), including an indication of a biometric measurement for each of the multiple users. The biometric measurements are combined to form a combined biometric indicator that can be used to authenticate and/or secure a system or space.

In some implementations, the biometric measurements are received simultaneously from multiple biometric sensors. For example, the biometric measurements may correspond to indications of facial recognition applied to images (e.g., pictures, video, or the like) captured from a first camera (e.g., user facing camera) and a second camera (e.g., world facing camera) of a computing device (e.g., smart phone, tablet, or the like). The indications of facial recognition for each user are combined to form a single combined biometric indicator. This single combined biometric indicator can be used to authenticate access to an application, system, and/or place.

With some implementations, the biometric measurements are received serially, such as, for example, within a limited time or each other. For example, the biometric measurements may correspond to indications of fingerprints captured from a fingerprint sensor of a computing device. The indications of fingerprints for each user are combined to form a single combined biometric indicator. This single combined biometric indicator can be used to authenticate access to an application, system, and/or place.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general computing device. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote instances where more than one such component may be implemented. It is important to note, that there need not necessarily be multiple components and further, where multiple components are implemented, they need not be identical. Instead, use of variables to reference components in the figures is done for convenience and clarity of presentation.

Figure 2:
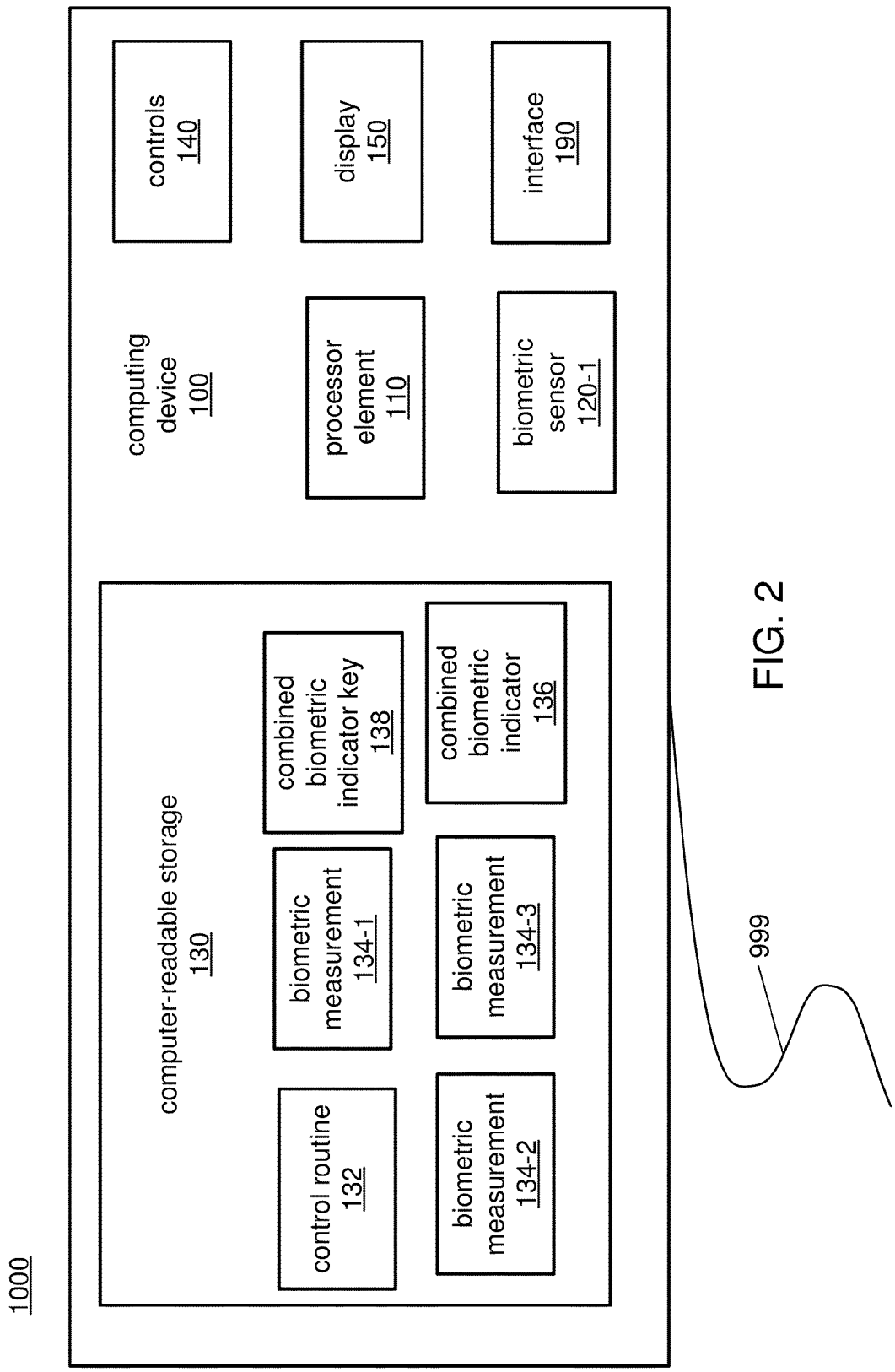

FIGS. 1-2 depict block diagrams of interactions among computing devices of a biometric authentication system 1000. The biometric authentication system 1000 may comprise one or more of a computing device 100. In general, FIG. 1 illustrates the system 1000 including the computing device 100 implemented with multiple biometric sensors, while FIG. 2 illustrates the system 1000 including the computing device 100 implemented with a single biometric sensor. It is worthy to note that although FIGS. 1-2 illustrate the computing device 100 as a single device, the system 1000 may be implemented with multiple devices. For example, biometric sensors may be deployed as separate devices and/or in separate locations from the rest of the system.

The computing device 100 may be any of a variety of types of computing devices, including without limitation, a desktop computer system, a data entry terminal, a laptop computer, a netbook computer, an ultrabook computer, a tablet computer, a handheld personal data assistant, a smartphone, a digital camera, a mobile device, a body-worn computing device incorporated into clothing, a computing device integrated into a vehicle, a computing device integrated into a home appliance, a server, a cluster of servers, a server farm, etc.

In various examples, the computing device 100 incorporates one or more of processor element 110, biometric sensor 120-$a$, storage 130, controls 140, a display 150, and interface 190 to couple the computing device 100 to the network 999. The storage 130 stores one or more of a control routine 132, biometric measurements 134-$b$, a combined biometric indicator 136, and a combined biometric indicator key 138. In general, the control routine 132 incorporates a sequence of instructions operative on the processor element 110 to implement logic to perform various functions.

Turning more specifically to FIG. 1, an example of a computing device configured to implement biometric authentication for multiple uses, arranged according to some embodiments of the present disclosure is depicted. In particular, the computing device 100 is depicted including biometric sensors 120-1 and 120-2. In executing a sequence of instructions of the control routine 132, the processor element 110 is caused to receive information from the biometric sensors 120-1 and 120-2. In some examples, the information is received simultaneously (e.g., substantially at the same time, approximately at the same time, or the like). It is important to note, that simultaneously does not necessarily mean exactly at the same time and instead is intended to mean the biometric information is sensed, scanned, or captured, from the biometric sensors 120-1 and 120-2 at substantially the same moment or within a threshold time of each other.

The received information includes indications of a number of biometric measurements. In particular, the received information includes an indication of a biometric measurement for each of a number of users. Specifically, the information includes the biometric measurements 134-$b$. In general, the biometric measurements may be based on any of a variety of physiological and/or behavioral characteristics, for example, without limitation, fingerprints, palm veins, face recognition, Deoxyribonucleic acid (DNA), palm print, hand geometry, iris, retina, scent, voice, or the like. It is important to note, that FIG. 1 depicts biometric measurements 134-1 and 134-2, which may correspond to biometric information related to a first and a second user, respectively. However, as described above, examples are not limited in this context and the present disclosure may be used to implement biometric authentication systems configured to receive biometric information for more than 2 users (e.g., refer to FIG. 2).

In executing the control routine 132, the processor element is further caused to generate the combined biometric indicator 136 from the biometric measurements 134-$b$. In particular, the processor element 110 generates the combined biometric indicator 136 from the biometric measurements 134-1 and 134-2. In general, the processor element 110 combined the biometric measurements 134-1 and 134-2 to form a single biometric measurement. In some examples, the processor element 110 may hash the biometric measurements 134-$a$ into a single biometric measurement. In some examples, the processor element 110 may apply fuzzy hashing techniques to generate the combined biometric indicator 136 from the biometric indicators 134-$b$.

In some examples, the combined biometric indicator 136 may be stored (e.g., on storage 130, within a secure enclave, or the like) as the combined biometric indicator key 138, which may be used as a key to a secured resource. As used herein, "secured resource" is intended to represent any resource (software, hardware, physical space, some combination of software, hardware, and/or physical space, or the like) secured by the biometric authentication techniques discussed herein. For example, the combined biometric indicator key 138 may be used to secure an application executing on the computing device 100, a hardware resource of the computing device 100, a separate computing system. As another example, the combined biometric indicator key 138 may be used to secure a geographic area, such as, a building, a room, a door, a pathway, or the like.

With some examples, the combined biometric indicator 136 may be used to access a secured resource. For example, in executing the control routine 132, the processor element 110 may determine whether the combined biometric indicator 136 matches the combined biometric indicator key 138 and may authenticate the combined biometric indicator 136 based on the determination that the combined biometric indicator 136 matches the combined biometric indicator key 138. In particular, the processor element 110 may enable access to the secured resource based on the determination that the combined biometric indicator 136 matches the combined biometric indicator key 138. In some examples, the processor element 110 may apply fuzzy hashing techniques to determine whether the combined biometric indicator 136 matches the combined biometric indicator key 138.

Turning more specifically to FIG. 2, another example of a computing device configured to implement biometric authentication for multiple uses, arranged according to some embodiments of the present disclosure is depicted. In particular, the computing device 100 is depicted including the biometric sensor 120-1. In executing a sequence of instructions of the control routine 132, the processor element 110 is caused to receive information from the biometric sensor 120-1. The received information includes indications of a number of biometric measurements. In particular, the received information includes an indication of a biometric measurement for each of a number of users. Specifically, the information includes the biometric measurements 134-$b$. In general, the biometric measurements may be based on any of a variety of physiological and/or behavioral characteristics, for example, without limitation, fingerprints, palm veins, face recognition, DNA, palm print, hand geometry, iris, retina, scent, voice, or the like. It is important to note, that FIG. 2 depicts biometric measurements 134-1, 134-2, and 134-3, which may correspond to biometric information related to a first user, a second user, and a third user, respectively. However, as described above, examples are not limited in this context and the present disclosure may be used to implement biometric authentication systems configured to receive biometric information for 2 or more users.

In executing the control routine 132, the processor element 110 may receive information including indications of the biometric measurements 134-1, 134-2, and 134-3 from the biometric sensor 120-1. In some examples, the biometric measurements may be received (e.g., sensed, scanned, or the like) in serial. For example, the biometric sensor 120-1 may be a fingerprint sensor (e.g., provided with a smart phone, or the like). The processor element may receive information from the biometric sensor 120-1 including indications of fingerprints corresponding to a number of users scanned by the biometric scanner 120-1. The processor element 110 may determine whether the biometric measurements 134-1, 134-2, and 134-3 were received within a threshold time of each other. For example, a first user may scan their fingerprint and pass the computing device to the second user who may then scan their fingerprint. Accordingly, the processor element 110 may determine whether the biometric measurements 134-b were received within a threshold time (e.g., less than 5 seconds, less than 10 seconds, less than 15 seconds, or the like) of each other.

In executing the control routine 132, the processor element 110 is further caused to generate the combined biometric indicator 136 from the biometric measurements 134-b. In particular, the processor element 110 generates the combined biometric indicator 136 from the biometric measurements 134-1, 134-2, and 134-3. Accordingly, the combined biometric indicator 136 will include indications for the biometric measurements 134-1, 134-2, and 134-3, corresponding to a first, second, and third user, respectively. In some examples, the processor element 110 may generate the combined biometric indicator 136 based on the determination that the biometric measurements 134-1, 134-2, and 134-2 were received from the biometric sensor 120-1 within a threshold time of each other. In some examples, the processor element may provide an error message (e.g., via display 150) based on the determination that the biometric measurements 134-1, 134-2, and 134-2 were not received from the biometric sensor 120-1 within a threshold time of each other.

In some examples, the computing device 100 may be configured to implement a security policy that require a subset of authorized users to be authenticated in order to allow access to a secured resource. For example, a security policy may state that three users of a total of six authorized users must be present in order to allow access to the secured resource. In such an example, the combined biometric indicator key 138 may include indications of biometric measurements for each of the six authorized users. In executing the control routine 132, the processor element 110 may determine whether the biometric measurements (e.g., the biometric measurements 134-1, 134-2, and 134-3) corresponding to the combined biometric indicator 136 match ones of the biometric measurements corresponding to the combined biometric indicator key 138.

For example, the processor element 110 may determine whether ones of the biometric measurements indicated in the combined biometric indicator key 138 matches the biometric measurements indicated in the combined biometric indicator 136 based on the fuzzy hashing techniques used to generate the combined biometric indicator 136 and the combined biometric indicator key 138.

Furthermore, the processor element may determine whether the combined biometric indicator 136 is authorized based on determining whether the number of users corresponding to the combined biometric indicator 136 exceed a number of necessary authorized users. For example, assume for purposes of explanation that the secured resource is an application for mobile banking. The ability to perform certain functions (e.g., transfer money, or the like) may be secured with the combined biometric indicator key 138. The combined biometric indicator key 138 may include indications of biometric measurements for six users (e.g., as explained above), while the security policy indicates that the function (e.g., transfer money) will be allowed provided that at least 3 of the authorized users are present. Accordingly, the processor component 110 may allow the function to execute provided that the combined biometric indicator 136 includes indications of biometric measurements for at least 3 of the users represented in the combined biometric indicator key 138.

In various embodiments, the processor element 110 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked.

In various embodiments, the biometric sensor(s) 120-a may include any of a wide variety of biometric sensors comprising both hardware and/or software necessary to detect, receive, process, acquire, and/or provide indications of biometric measurements. For example, without limitation, the biometric sensor(s) 120-a may include a fingerprint sensor, a hand scanner, an eye scanner, an odor detector, or a camera. Furthermore, the biometric sensor(s) 120-a may include or be operably coupled with biometric detection systems, for example, without limitation, facial recognition systems, gait recognition systems, or the like.

In various embodiments, the storage 130 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the controls 140 and the display 150 may provide a user interface for an operator of the computing device 100. The controls 140 may be any of a variety of types of manually operable control including and not limited to one or more of a keyboard, mouse, keypad, touchpad, stylus, or the like. The display 150 may be any of a variety of types of display devices including and not limited to a liquid crystal display (LCD), an electroluminescent (EL) display, a plasma display, etc. Further, it should be noted that the controls 140 and the display 150 might be combined into a single component such as a touchscreen display.

In various embodiments, the interface 190 may employ any of a wide variety of signaling technologies enabling the computing device 100 to be coupled through the network 999. In particular, the computing device 100 may exchange signals (e.g., with a secured resource, with another computing device, or the like) conveying executable instructions and data associated with biometric authentication through the network 999. Additionally, the computing device 100 may exchange other data entirely unrelated to biometric authentication or biometric measurements.

In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Accordingly, the interface 190 may include circuitry providing at least some of the requisite functionality to enable such coupling. However, the interface 190 may also be at least partially implemented with sequences of instructions executed by the processor element 110 (e.g., to implement a protocol stack or other features). Where one or more portions of the network 999 employs electrically and/or optically conductive cabling, the interface may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, corresponding ones of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although the interface is depicted as a single block, it might include multiple interfaces that may be based on differing signaling technologies. This may be the case especially where one or more of these interfaces couples the computing device 100 to more than one network, each employing differing communications technologies.

Furthermore, the processor element 110 and/or the storage 130 may include features to enable the secure execution of or access to a secured resource. For example, the processor element 110 and/or the storage 130 may implement various security, encryption, protected memory, and/or secure enclaves, in order to restrict access to the secured resource to those who are authenticated by the biometric authentication techniques described herein.

Figure 3:
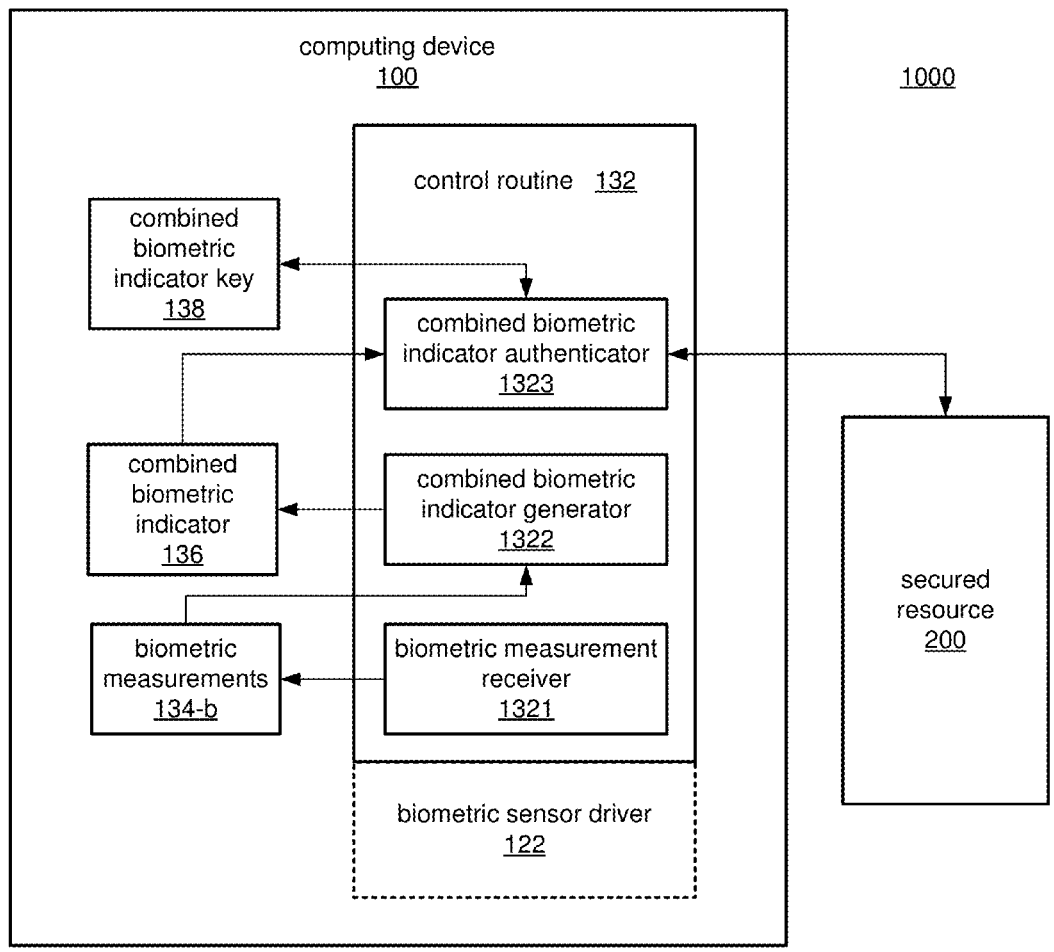
FIG. 3 is a block diagram illustrating portions of the system of FIGS. 1-2 in greater detail.

FIG. 3 illustrates a portion of the system 1000 of FIGS. 1 and 2 in greater detail. More specifically, this figure depicts aspects of the operating environment of the computing device 100, in which the processor element 110, by execution of the control routine 132, is caused to perform at least some of the biometric authentication functions described above. As will be appreciated by those of ordinary skill in the art, the control routine 132, including the components of which it is composed, is selected to be operative on whatever type of processor or processors are selected to implement the processor element 110.

In various embodiments, the control routine 132 may include a combination of an operating system, device drivers and/or application-level routines (e.g., so-called "software suites" provided on disc media, "applets" obtained from a remote server, etc.). Where an operating system is included, the operating system may be any of a variety of available operating systems, including without limitation, Windows™, OS X™, Linux®, or Android OS™. Where one or more device drivers are included, those device drivers may provide support for any of a variety of other components, whether hardware or software components, of the computing device 110.

As depicted, the control routine 132 incorporates at least a biometric measurement receiver 1321, a combined biometric indicator generator 1322, and a combined biometric indicator authenticator 1323. In general, the control routine 132 receives biometric measurements 134-$b$ from the biometric scanner, generates the combined biometric indicator 136 from the received biometric measurements 134-$b$ and secures or allows access to the secured resource 200 based on the combined biometric indicator 136. For example, the combined biometric indicator 136 may be stored as the combined biometric indicator key 138 to secure the secured resource 200. As another example, the combined biometric indicator 136 may be authenticated against the secured biometric indicator key 138 to provide secured access to the secured resource 200.

The biometric measurement receiver 1321 receives the biometric measurements 134-$b$. In particular, the biometric receiver 1321 may receive information from the biometric sensor(s) 120-$a$, such as, for example, via the biometric sensor driver 122, where the received information includes indications of the biometric measurements **134-*b*. In some embodiments, the biometric measurements 134-*b* may correspond to signals received from the biometric sensors 120-*a* that indicate a biometric measurement for a user. For example, the biometric measurement receiver 1321 may receive information indicating a fingerprint or characteristics related to a fingerprint for each of a number of users. As another example, the biometric measurement receiver 1321** may receive information indicating the results of facial recognition applied to an image (or images) representing each of a number of users.

In some embodiments, the biometric measurement receiver 1321 receives each of the biometric measurements **134-*b* from a different biometric sensor 120-*a*. For example, in the case where the biometric measurements 134-*b* correspond to results of facial recognition applied to images, the biometric measurement receiver 1321** may receive indications of a first facial recognition result (e.g., corresponding to a first user) from a first camera (e.g., a user view camera of a smart phone, or the like) and receive indications of a second facial recognition result (e.g., corresponding to a second user) from a second camera (e.g., a world view camera of the smart phone, or the like).

In some embodiments, the biometric measurement receiver 1321 receives each of the biometric measurements **134-*b* from one or more biometric sensors 120-*a*. For example, in the case where the biometric measurements 134-*b* correspond to fingerprints, the biometric measurement receiver 1321** may receive indications of a first fingerprint (e.g., corresponding to a first user) from a fingerprint sensor (e.g., a fingerprint sensor of a smart phone, or the like) and receive indications of a second fingerprint (e.g., corresponding to a second user) from the same fingerprint sensor.

The combined biometric indicator generator 1322 generates the combined biometric indicator 136 from the biometric measurements **134-*b*. In particular, the biometric indicator generator 1322 can generate a single representation (e.g., the combined biometric indicator 136) corresponding to the various biometric measurements 134-*b*. In some embodiments, the combined biometric indicator generator 1322 applies fuzzy hashing techniques to form the combined biometric indicator 136 from the various biometric measurements 134-*b***.

The combined biometric indicator authenticator 1323 secures and/or authenticates the secured resource 200 using the combined biometric indicator 136. For example, the combined biometric indicator authenticator 1323 can store the generated combined biometric indicator 136 as the combined biometric indicator key 138 to serve as a key to restrict access to the secured resource 200. As such, the system 100 can later be used to deny or authorize access to the secured resource 200 by comparing a newly generate combined biometric indicator (not shown) to the stored combined biometric indicator key 138. In particular, the combined biometric indicator authenticator 1323 can compare the generated combined biometric indicator 136 to a previously stored combined biometric indicator key 138 in order to authorize or deny access to the secured resource 200.

Figure 4:
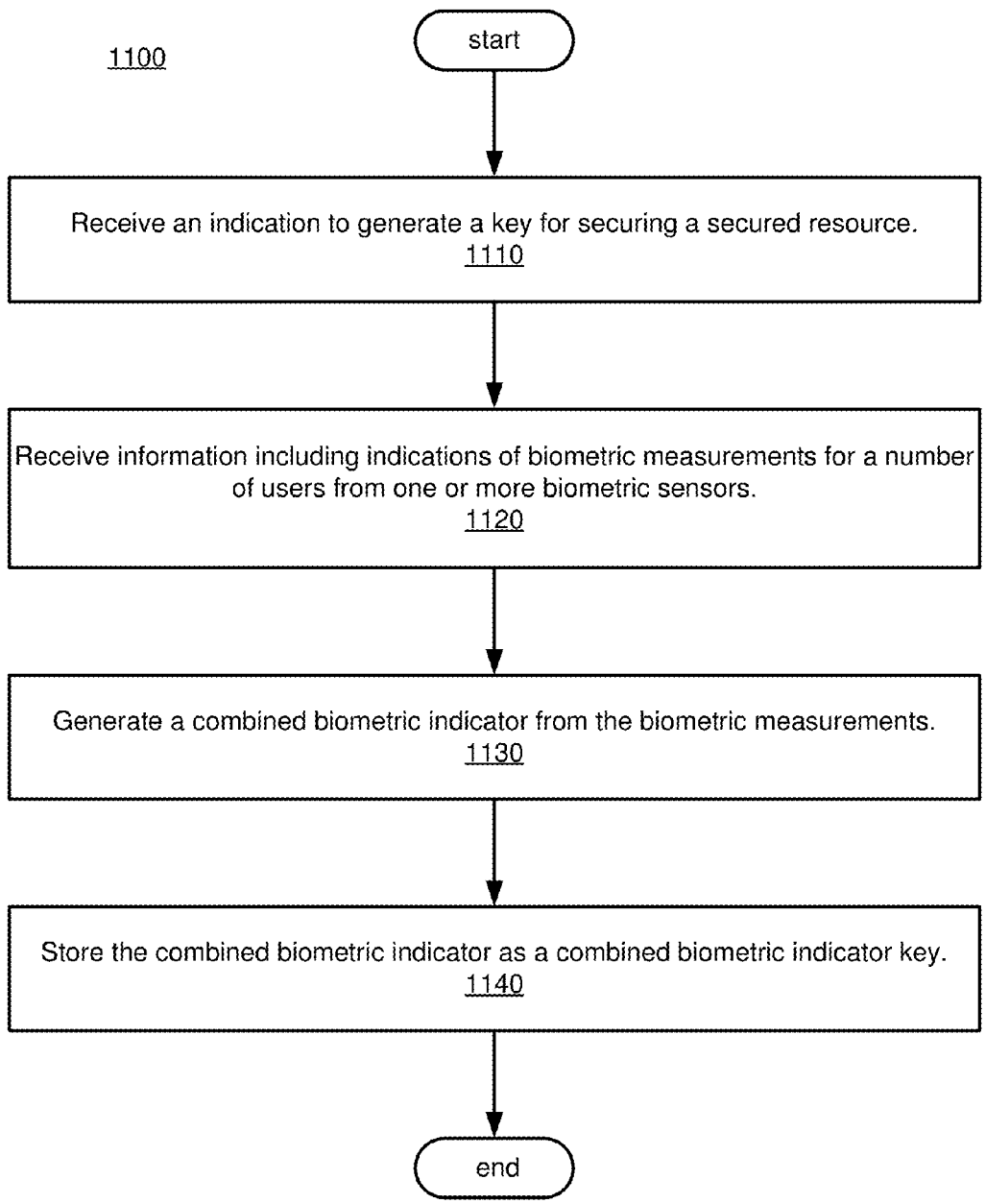
FIGS. 4-6 are flow diagrams illustrating logic flows implemented by a biometric authentication system.
Figure 5:
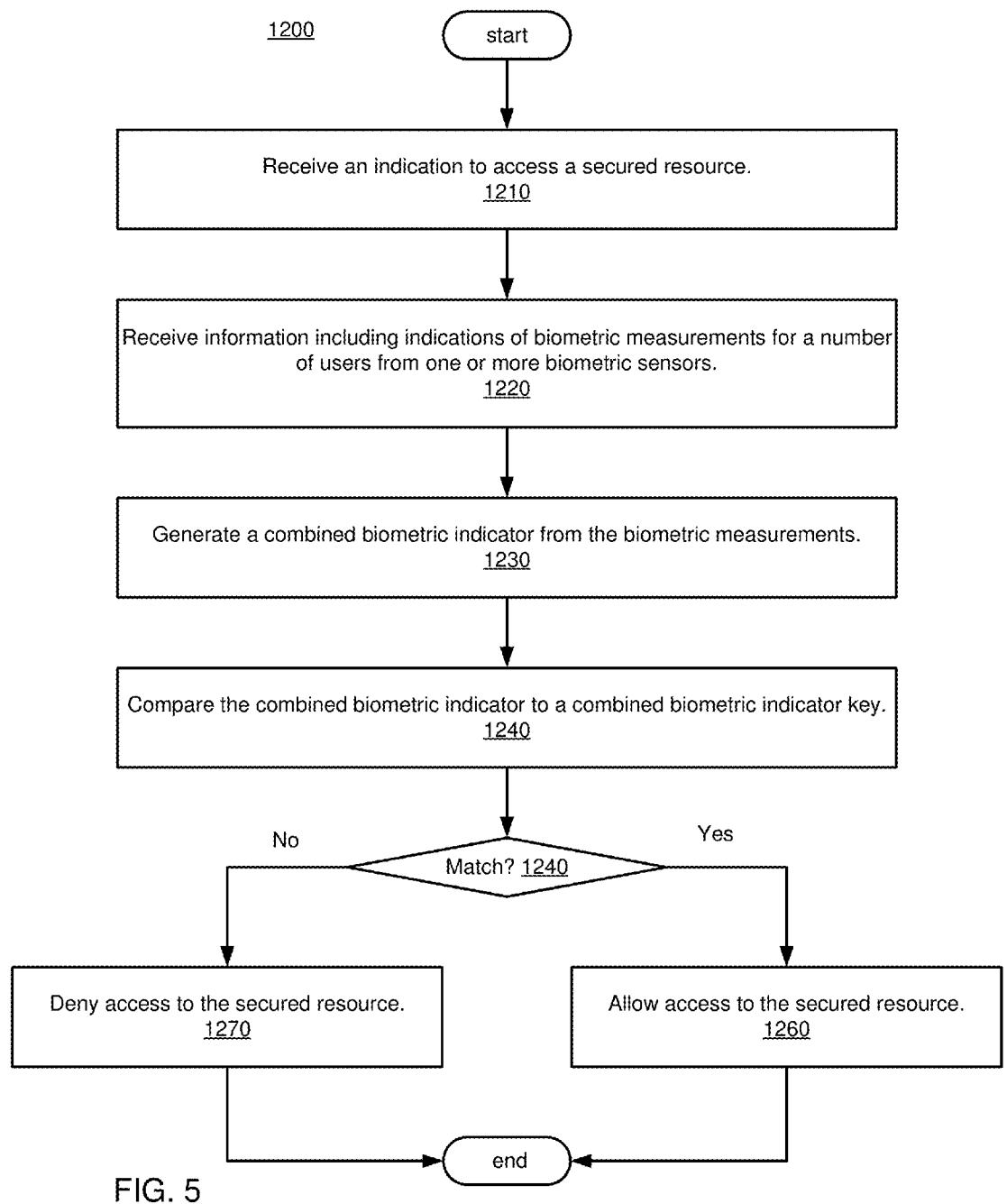
Figure 6:
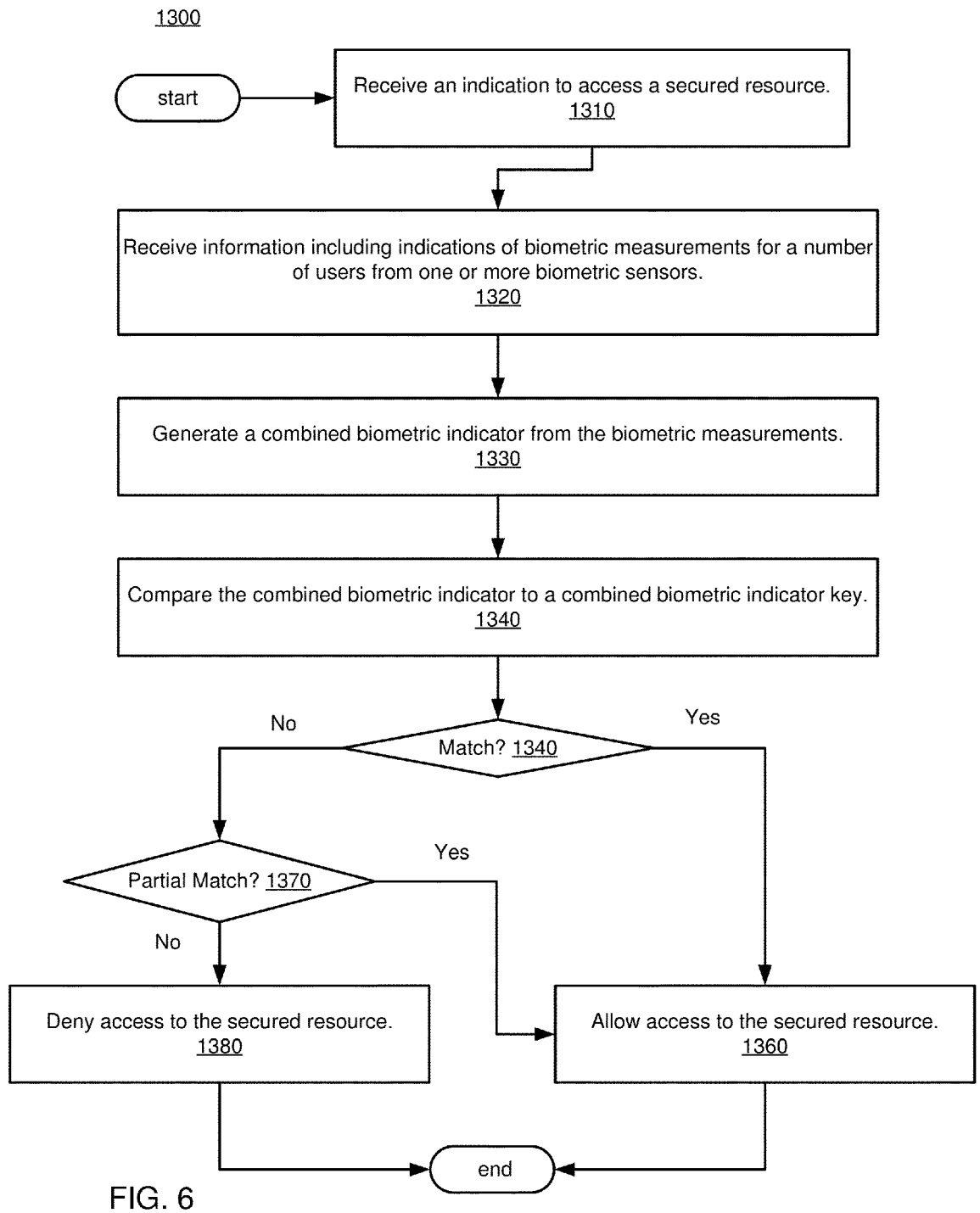

FIGS. 4-6 illustrate embodiments of logic flows for multiple user biometric authentication as described herein. In particular, FIG. 4 illustrates a method 1100 for generating a combined biometric indicator key for securing a secured resource while FIGS. 5-6 illustrates method 1200 and 1300, respectively, for accessing a secured resource using a combined biometric indicator. It is to be appreciated, that the methods 1100 and 1200 are described with reference to FIGS. 1-3 and the system 1000. However, examples are not limited in this context and in particular, the methods 1100, 1200, and 1300 may be implemented by systems including similar or different components to the system 1000.

Turning more specifically to FIG. 4, the method 1100 may begin at block 1110. At block 1110, "receive an indication to generate a key for securing a secured resource," the control routine 132 may receive an indication to generate a key for securing the secured resource 200. For example, the processor component 110, by execution of the control routine 132, may receive an indication (e.g., via controls 130, or the like) to generate a key to secure the secured resource 200.

Continuing to block 1120, "receive information including indications of biometric measurements for a number of users from one or more biometric sensors," the biometric measurement receiver 1321 may receive the biometric measurements **134-*b* from the biometric sensor(s) 120-*a*. For example, the biometric measurement receiver 1321 may receive the biometric measurements 134-1 and 134-2 from the biometric sensors 120-1 and 120-2, respectively. As another example, the biometric measurement receiver 1321 may receive the biometric measurements 134-1, 134-2, and 134-3 from the biometric sensor 120-1**.

Continuing to block 1130, "generate a combined biometric measurement indicator from the biometric measurements," the combined biometric indicator generate 1322 generates the combined biometric indicator 136 from the biometric measurements **134-*b*. Continuing to block 1140, "store the combined biometric measurement indicator as a combined biometric measurement indicator key," the combined biometric indicator authenticator 1323 stores the combined biometric indicator 136 as the combined biometric indicator key 138**.

Turning more specifically to FIG. 5, the method 1200 may begin at block 1210. At block 1210, "receive an indication to access a secured resource," the control routine 132 may receive an indication to access the secured resource 200. For example, the processor component 110, by execution of the control routine 132, may receive an indication (e.g., via controls 130, or the like) to access the secured resource 200.

Continuing to block 1220, "receive information including indications of biometric measurements for a number of users from one or more biometric sensors," the biometric measurement receiver 1321 may receive the biometric measurements **134-*b* from the biometric sensor(s) 120-*a*. For example, the biometric measurement receiver 1321 may receive the biometric measurements 134-1 and 134-2 from the biometric sensors 120-1 and 120-2, respectively. As another example, the biometric measurement receiver 1321 may receive the biometric measurements 134-1, 134-2, and 134-3 from the biometric sensor 120-1. Continuing to block 1230, "generate a combined biometric measurement indicator from the biometric measurements," the combined biometric indicator generator 1322 generates the combined biometric indicator 136 from the biometric measurements 134-*b***.

Continuing to block 1240, "compare the combined biometric indicator to a combined biometric indicator key," the combined biometric indicator authenticator 1323 may compare the combined biometric indicator 136 to the combined biometric indicator key 138. Continuing to block 1250, "does the combined biometric indicator match the combined biometric indicator key?" the combined biometric indicator authenticator 1323 may determine whether the combined biometric indicator 136 matches the combined biometric indicator key 138. Based on the determination at block 1250, the method 1200 may continue to either block 1260 or block 1270.

At block 1260, "allow access to the secured resource," the combined biometric indicator authenticator 1323 may allow access to the secured resource based 200 on the determination that the combined biometric indicator 136 does match the combined biometric indicator key 138. Conversely, at block 1270, "deny access to the secured resource," the combined biometric indicator authenticator 1323 may deny access to the secured resource 200 based on the determination that the combined biometric indicator 136 does not match the combined biometric indicator key 138.

Turning more specifically to FIG. 6, the method 1300 may begin at block 1310. At block 1310, "receive an indication to access a secured resource," the control routine 132 may receive an indication to access the secured resource 200. For example, the processor component 110, by execution of the control routine 132, may receive an indication (e.g., via controls 130, or the like) to access the secured resource 200.

Continuing to block 1320, "receive information including indications of biometric measurements for a number of users from one or more biometric sensors," the biometric measurement receiver 1321 may receive the biometric measurements 134-$b$ from the biometric sensor(s) 120-$a$. For example, the biometric measurement receiver 1321 may receive the biometric measurements 134-1 and 134-2 from the biometric sensors 120-1 and 120-2, respectively. As another example, the biometric measurement receiver 1321 may receive the biometric measurements 134-1, 134-2, and 134-3 from the biometric sensor 120-1. Continuing to block 1330, "generate a combined biometric measurement indicator from the biometric measurements," the combined biometric indicator generate 1322 generates the combined biometric indicator 136 from the biometric measurements 134-$b$.

Continuing to block 1340, "compare the combined biometric indicator to a combined biometric indicator key," the combined biometric indicator authenticator 1323 may compare the combined biometric indicator 136 to the combined biometric indicator key 138. Continuing to block 1350, "does the combined biometric indicator match the combined biometric indicator key?" the combined biometric indicator authenticator 1323 may determine whether the combined biometric indicator 136 matches the combined biometric indicator key 138. Based on the determination at block 1350, the method 1300 may continue to either block 1360 or block 1370.

At block 1360, "allow access to the secured resource," the combined biometric indicator authenticator 1323 may allow access to the secured resource based 200 on the determination that the combined biometric indicator 136 does match the combined biometric indicator key 138.

At block 1370, "do a required number of biometric measurements represented in the combined biometric indicator match biometric measurements represented in the combined biometric indicator key?" the combined biometric indicator authenticator 1323 may determine whether a specified number (e.g., based on a security policy, or the like) of the biometric measurements represented in the combined biometric indicator 136 match biometric measurements in the combined biometric indicator key 138. Based on the determination at block 1370, the method 1300 may continue to either block 1360 or block 1380.

As depicted, the method 1300 may continue from block 1370 to block 1360 and allow access to the secured resource 200 based on the determination that a specified number of biometric measurements represented in the combined biometric indicator 136 does match biometric measurements in the combined biometric indicator key 138. Conversely, at block 1380, "deny access to the secured resource," the combined biometric indicator authenticator 1323 may deny access to the secured resource 200 based on the determination that biometric measurements represented in the combined biometric indicator 136 does not match a specified number of biometric measurements represented in the combined biometric indicator key 138.

Figure 7:
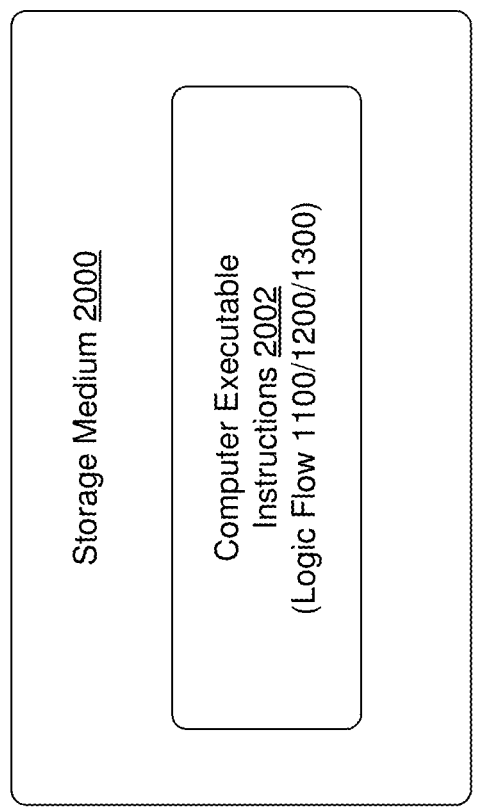
FIG. 7 is a block diagram illustrating a computer-readable storage medium.

FIG. 7 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement logic flow 1100. In some examples, the storage medium 2000 may store various types of computer executable instructions to implement logic flow 1200. In some examples, the storage medium 2000 may store various types of computer executable instructions to implement logic flow 1300.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
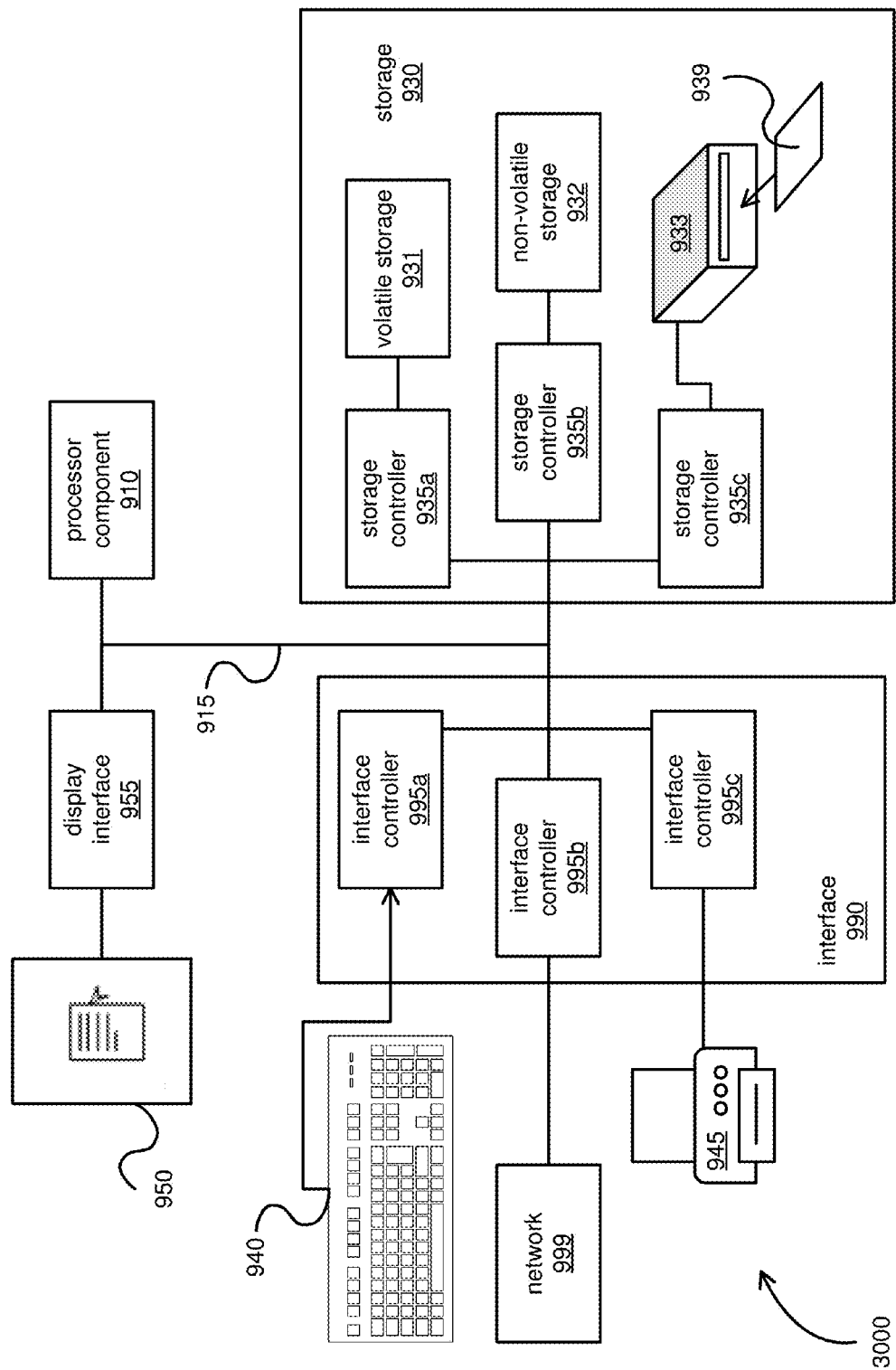
FIG. 8 is a block diagram illustrating an embodiment of a processing architecture.

FIG. 8 illustrates an embodiment of an exemplary processing architecture 3000 suitable for implementing various embodiments as previously described. More specifically, the processing architecture 3000 (or variants thereof) may be implemented as part of the computing device 100. It should be noted that components of the processing architecture 3000 are given reference numbers in which the last two digits correspond to the last two digits of reference numbers of components earlier depicted and described as part of the previously described computing device. This is done as an aid to correlating such components of whichever ones of these computing devices may employ this exemplary processing architecture in various embodiments.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 910, a storage 930, an interface 990 to other devices, and coupling 915. Depending on various aspects of a computing device implementing the processing architecture 3000, including its intended use and/or conditions of use, such a computing device may further incorporate additional components, such as without limitation, a counter element 915.

The coupling 915 incorporates one or more buses, point-to-point interconnects, transceivers, buffers, crosspoint switches, and/or other conductors and/or logic that communicatively couples at least the processor element 910 to the storage 930. The coupling 915 may further couple the processor element 910 to one or more of the interface 990 and the display interface 955 (depending on which of these and/or other components are also present). With the processor element 910 being so coupled by couplings 915, the processor element 910 is able to perform the various ones of the tasks described at length, above, for whichever ones of the computing devices 100, 300 and 600 implement the processing architecture 3000. The coupling 915 may be implemented with any of a variety of technologies or combinations of technologies by which signals are optically and/or electrically conveyed. Further, at least portions of couplings 915 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor element 910 (corresponding to one or more of the processor elements 150, 350, 450 and 650) may include any of a wide variety of commercially available processors, employing any of a wide variety of technologies and implemented with one or more cores physically combined in any of a number of ways.

As previously discussed, the storage 930 (corresponding to one or more of the storages 160, 360, 460 and 660) may include one or more distinct storage devices based on any of a wide variety of technologies or combinations of technologies. More specifically, as depicted, the storage 930 may include one or more of a volatile storage 931 (e.g., solid state storage based on one or more forms of RAM technology), a non-volatile storage 932 (e.g., solid state, ferromagnetic or other storage not requiring a constant provision of electric power to preserve their contents), and a removable media storage 933 (e.g., removable disc or solid state memory card storage by which information may be conveyed between computing devices). This depiction of the storage 930 as possibly comprising multiple distinct types of storage is in recognition of the commonplace use of more than one type of storage device in computing devices in which one type provides relatively rapid reading and writing capabilities enabling more rapid manipulation of data by the processor element 910 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 931 is present and is based on RAM technology, the volatile storage 931 may be communicatively coupled to coupling 915 through a storage controller 935a providing an appropriate interface to the volatile storage 931 that perhaps employs row and column addressing, and where the storage controller 935a may perform row refreshing and/or other maintenance tasks to aid in preserving information stored within the volatile storage 931. By way of another example, where the non-volatile storage 932 is present and includes one or more ferromagnetic and/or solid-state disk drives, the non-volatile storage 932 may be communicatively coupled to coupling 915 through a storage controller 935b providing an appropriate interface to the non-volatile storage 932 that perhaps employs addressing of blocks of information and/or of cylinders and sectors. By way of still another example, where the removable media storage 933 is present and includes one or more optical and/or solid-state disk drives employing one or more pieces of removable machine-readable storage media 939, the removable media storage 933 may be communicatively coupled to coupling 915 through a storage controller 935c providing an appropriate interface to the removable media storage 933 that perhaps employs addressing of blocks of information, and where the storage controller 935c may coordinate read, erase and write operations in a manner specific to extending the lifespan of the machine-readable storage media 939.

One or the other of the volatile storage 931 or the non-volatile storage 932 may include an article of manufacture in the form of a machine-readable storage media on which a routine comprising a sequence of instructions executable by the processor element 910 may be stored, depending on the technologies on which each is based. By way of example, where the non-volatile storage 932 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 932 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 910 may initially be stored on the machine-readable storage media 939, and the removable media storage 933 may be subsequently employed in copying that routine to the non-volatile storage 932 for longer term storage not requiring the continuing presence of the machine-readable storage media 939 and/or the volatile storage 931 to enable more rapid access by the processor element 910 as that routine is executed.

As previously discussed, the interface 990 (corresponding to one or more of the interfaces 190 and 690, as well as an interface incorporating the interface controllers 395a and 395b) may employ any of a variety of signaling technologies corresponding to any of a variety of communications technologies that may be employed to communicatively couple a computing device to one or more other devices. Again, one or both of various forms of wired or wireless signaling may be employed to enable the processor element 910 to interact with input/output devices (e.g., the depicted example keyboard 940 or printer 945) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 940. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 945. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 950), such a computing device implementing the processing architecture 3000 may also incorporate the display interface 955. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 955 in a communicative coupling of the display 950 may make use of signaling and/or protocols that conform to any of a variety of industry standards, including without limitation, any of a variety of analog video interfaces, Digital Video Interface (DVI), DisplayPort, etc.

More generally, the various elements of the computing devices 100, 300 and 600 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

An apparatus to secure access to a system comprising a processor element; and logic executable by the processor component, the logic to: receive information including an indication of a plurality of biometric measurements; and generate a combined biometric indicator based in part on the plurality of biometric measurements.

Example 2

The apparatus of example 1, the logic to hash the plurality of biometric measurements to generate the combined biometric indicator.

Example 3

The apparatus of example 2, the logic to hash the plurality of biometric measurements based on one or more fuzzy hashing techniques.

Example 4

The apparatus of example 1, comprising: a computer-readable storage operably coupled to the processor element; the logic further to store the combined biometric indicator as a combined biometric indicator key on the computer-readable storage.

Example 5

The apparatus of example 1, comprising: a computer-readable storage operably coupled to the processor element; the logic further to: determine whether the combined biometric indicator matches a combined biometric indicator key stored on the computer-readable storage; and authenticate the combined biometric indicator based on the determination that the combined biometric indicator matches the combined biometric indicator key.

Example 6

The apparatus of example 5, the combined biometric indicator key to include indications of a biometric measurement for each of a plurality of entities, the logic further to: determine whether the plurality of biometric measurements corresponding to the combined biometric indicator match the biometric measurements for ones of the plurality of entities; and determine that the combined biometric indicator matches the combined biometric indicator key based on the determination that the plurality of biometric measurements corresponding to the combined biometric indicator match the biometric measurements for ones of the plurality of entities.

Example 7

The apparatus of example 6, the logic to determine whether the plurality of biometric measurements corresponding to the combined biometric indicator match the biometric measurements for at least a number of the plurality of entities.

Example 8

The apparatus of example 5, the logic further to allow access to a secured resource based on the authenticated combined biometric indicator.

Example 9

The apparatus of example 8, wherein the secured resource is selected from a group comprising of an application, a software program, a hardware resource, a geographic location, or a physical pathway.

Example 10

The apparatus of any one of examples 1 to 9, comprising: one or more biometric sensors operably coupled to the processor element; the logic further to receive the plurality of biometric measurements from the one or more biometric sensors.

Example 11

The apparatus of example 10, the plurality of biometric measurements to include indications of a characteristic selected from a group comprising of fingerprints, palm vein, face recognition, DNA, palm print, hand geometry, iris, retina, scent, or voice.

Example 12

The apparatus of any one of examples 1 to 9, comprising: a first camera operably coupled to the processor element; the logic further to: receive a first image captured from the first camera; and determine a first one of the plurality of biometric measurements from the first image.

Example 13

The apparatus of example 12, the logic further to determine a second one of the plurality of biometric measurements from the first image.

Example 14

The apparatus of example 12, the logic further to: receive a second image captured from the first camera; determine whether the second image is captured within a threshold time of the first image; and determine a second one of the plurality of biometric measurements from the second image based on the determination that the second image is captured within a threshold time of the first image.

Example 15

The apparatus of example 12, comprising: a second camera operably coupled to the processor element; the logic further to: receive a second image captured from the second camera; and determine a second one of the plurality of biometric measurements from the second image.

Example 16

The apparatus of example 15, the logic to determine whether the first image and the second image are captured simultaneously.

Example 17

The apparatus of example 15, wherein the plurality of biometric measurements are face recognition measurements and the first and second image correspond to video streams captured from the first and second camera, the logic to dynamically update the combined biometric indicator to include indications of changes in one or more of the plurality of biometric measurements.

Example 18

The apparatus of any one of examples 1 to 9, comprising: a fingerprint sensor operably coupled to the processor element; the logic further to: receive an indication of a first fingerprint captured from the fingerprint sensor; receive an indication of a second fingerprint captured from the fingerprint sensor; and determine whether the indication of the second fingerprint is captured within a threshold time of the first fingerprint.

Example 19

At least one machine-readable storage medium comprising instructions that when executed by a computing device, cause the computing device to: receive information including an indication of a plurality of biometric measurements; and generate a combined biometric indicator based in part on the plurality of biometric measurements.

Example 20

The at least one machine-readable storage medium of example 19, the computing device caused to hash the plurality of biometric measurements to generate the combined biometric indicator.

Example 21

The at least one machine-readable storage medium of example 20, the computing device caused to hash the plurality of biometric measurements based on one or more fuzzy hashing techniques.

Example 22

The at least one machine-readable storage medium of example 19, the computing device caused to store the combined biometric indicator as a combined biometric indicator key on a computer-readable storage.

Example 23

The at least one machine-readable storage medium of example 19, the computing device caused to: determine whether the combined biometric indicator matches a combined biometric indicator key stored on a computer-readable storage; and authenticate the combined biometric indicator based on the determination that the combined biometric indicator matches the combined biometric indicator key.

Example 24

The at least one machine-readable storage medium of example 23, the combined biometric indicator key to include indications of a biometric measurement for each of a plurality of entities, the computing device caused to: determine whether the plurality of biometric measurements corresponding to the combined biometric indicator match the biometric measurements for ones of the plurality of entities; and determine that the combined biometric indicator matches the combined biometric indicator key based on the determination that the plurality of biometric measurements corresponding to the combined biometric indicator match the biometric measurements for ones of the plurality of entities.

Example 25

The at least one machine-readable storage medium of example 24, the computing device caused to determine whether the plurality of biometric measurements corresponding to the combined biometric indicator match the biometric measurements for at least a number of the plurality of entities.

Example 26

The at least one machine-readable storage medium of example 23, the computing device caused to allow access to a secured resource based on the authenticated combined biometric indicator.

Example 27

The at least one machine-readable storage medium of example 26, wherein the secured resource is selected from a group comprising of an application, a software program, a hardware resource, a geographic location, or a physical pathway.

Example 28

The at least one machine-readable storage medium of example 19 to 27, the computing device caused to receive the plurality of biometric measurements from one or more biometric sensors.

Example 29

The at least one machine-readable storage medium of example 28, the plurality of biometric measurements to include indications of a characteristic selected from a group comprising of fingerprints, palm vein, face recognition, DNA, palm print, hand geometry, iris, retina, scent, or voice.

Example 30

The at least one machine-readable storage medium of example 19 to 27, the computing device caused to: receive a first image captured from a first camera; and determine a first one of the plurality of biometric measurements from the first image.

Example 31

The at least one machine-readable storage medium of example 30, the computing device caused to determine a second one of the plurality of biometric measurements from the first image.

Example 32

The at least one machine-readable storage medium of example 30, the computing device caused to: receive a second image captured from the first camera; determine whether the second image is captured within a threshold time of the first image; and determine a second one of the plurality of biometric measurements from the second image based on the determination that the second image is captured within a threshold time of the first image.

Example 33

The at least one machine-readable storage medium of example 24, the computing device caused to: receive a second image captured from a second camera; and determine a second one of the plurality of biometric measurements from the second image.

Example 34

The at least one machine-readable storage medium of example 33, the computing device caused to determine whether the first image and the second image are captured simultaneously.

Example 35

The at least one machine-readable storage medium of example 33, wherein the plurality of biometric measurements are face recognition measurements and the first and second image correspond to video streams captured from the first and second camera, the computing device caused to dynamically update the combined biometric indicator to include indications of changes in one or more of the plurality of biometric measurements.

Example 36

The at least one machine-readable storage medium of examples 19 to 27, the computing device caused to: receive an indication of a first fingerprint captured from a fingerprint sensor; receive an indication of a second fingerprint captured from the fingerprint sensor; and determine whether the indication of the second fingerprint is captured within a threshold time of the first fingerprint.

Example 37

A computer-implemented method comprising: receiving information including an indication of a plurality of biometric measurements; and generating a combined biometric indicator based in part on the plurality of biometric measurements.

Example 38

The computer-implemented method of example 37, comprising hashing the plurality of biometric measurements to generate the combined biometric indicator.

Example 39

The computer-implemented method of example 38, comprising hashing the plurality of biometric measurements based on one or more fuzzy hashing techniques.

Example 40

The computer-implemented method of example 37, comprising storing the combined biometric indicator as a combined biometric indicator key on a computer-readable storage.

Example 41

The computer-implemented method of example 37, comprising: determining whether the combined biometric indicator matches a combined biometric indicator key stored on a computer-readable storage; and authenticating the combined biometric indicator based on the determination that the combined biometric indicator matches the combined biometric indicator key.

Example 42

The computer-implemented method of example 41, the combined biometric indicator key to include indications of a biometric measurement for each of a plurality of entities, the method comprising: determining whether the plurality of biometric measurements corresponding to the combined biometric indicator match the biometric measurements for ones of the plurality of entities; and determining that the combined biometric indicator matches the combined biometric indicator key based on the determination that the plurality of biometric measurements corresponding to the combined biometric indicator match the biometric measurements for ones of the plurality of entities.

Example 43

The computer-implemented method of example 42, comprising determining whether the plurality of biometric measurements corresponding to the combined biometric indicator match the biometric measurements for at least a number of the plurality of entities.

Example 44

The computer-implemented method of example 41, comprising allowing access to a secured resource based on the authenticated combined biometric indicator.

Example 45

The computer-implemented method of example 44, wherein the secured resource is selected from a group comprising of an application, a software program, a hardware resource, a geographic location, or a physical pathway.

Example 46

The computer-implemented method of examples 37 to 45, comprising receiving the plurality of biometric measurements from one or more biometric sensors.

Example 47

The computer-implemented method of example 46, the plurality of biometric measurements to include indications of a characteristic selected from a group comprising of fingerprints, palm vein, face recognition, DNA, palm print, hand geometry, iris, retina, scent, or voice.

Example 48

The computer-implemented method of examples 37 to 45, comprising: receiving a first image captured from a first camera; and determining a first one of the plurality of biometric measurements from the first image.

Example 49

The computer-implemented method of example 48, comprising determining a second one of the plurality of biometric measurements from the first image.

Example 50

The computer-implemented method of example 48, comprising: receiving a second image captured from the first camera; determining whether the second image is captured within a threshold time of the first image; and determining a second one of the plurality of biometric measurements from the second image based on the determination that the second image is captured within a threshold time of the first image.

Example 51

The computer-implemented method of example 48, comprising: receiving a second image captured from a second camera; and determining a second one of the plurality of biometric measurements from the second image.

Example 52

The computer-implemented method of example 51, comprising determining whether the first image and the second image are captured simultaneously.

Example 53

The computer-implemented method of example 51, wherein the plurality of biometric measurements are face recognition measurements and the first and second image correspond to video streams captured from the first and second camera, the method comprising updating the combined biometric indicator to include indications of changes in one or more of the plurality of biometric measurements.

Example 54

The computer-implemented method of examples 37 to 45, comprising: receiving an indication of a first fingerprint captured from a fingerprint sensor; receiving an indication of a second fingerprint captured from the fingerprint sensor; and determining whether the indication of the second fingerprint is captured within a threshold time of the first fingerprint.

Example 55

An apparatus for a wearable computing device configured for multiple user biometric authentication, the apparatus comprising means for performing the method of any one of examples 37 to 54.

What is claimed is:

1. An apparatus to secure access to a system, comprising:
a processor element; and
logic executable by the processor element, the logic to:
receive information including an indication of a plurality of biometric measurements, a first one of the plurality of biometric measurements corresponding to a first entity and a second one of the plurality of biometric measurements corresponding to a second entity; and
generate a combined biometric indicator based in part on the plurality of biometric measurements.

2. The apparatus of claim 1, the logic to hash the plurality of biometric measurements based on one or more fuzzy hashing techniques.

3. The apparatus of claim 1, comprising:
a computer-readable storage operably coupled to the processor element;
the logic further to store the combined biometric indicator as a combined biometric indicator key on the computer-readable storage.

4. The apparatus of claim 1, comprising:
a computer-readable storage operably coupled to the processor element;
the logic further to:
determine whether the combined biometric indicator matches a combined biometric indicator key stored on the computer-readable storage; and
authenticate the combined biometric indicator based on the determination that the combined biometric indicator matches the combined biometric indicator key.

5. The apparatus of claim 4, the combined biometric indicator key to include indications of a biometric measurement for each of a plurality of entities, the logic further to:
determine whether the plurality of biometric measurements corresponding to the combined biometric indicator match the biometric measurements for ones of the plurality of entities; and
determine that the combined biometric indicator matches the combined biometric indicator key based on the determination that the plurality of biometric measurements corresponding to the combined biometric indicator match the biometric measurements for ones of the plurality of entities.

6. The apparatus of claim 5, the logic to determine whether the plurality of biometric measurements corresponding to the combined biometric indicator match the biometric measurements for at least a number of the plurality of entities.

7. The apparatus of claim 4, the logic further to allow access to a secured resource based on the authenticated combined biometric indicator.

8. The apparatus of claim 7, wherein the secured resource is selected from a group comprising an application, a software program, a hardware resource, a geographic location, or a physical pathway.

9. The apparatus of any one of claim 1, comprising:
one or more biometric sensors operably coupled to the processor element;
the logic further to receive the plurality of biometric measurements from the one or more biometric sensors.

10. The apparatus of claim 9, the plurality of biometric measurements to include indications of a characteristic selected from a group comprising fingerprints, palm vein, face recognition, Deoxyribonucleic acid, palm print, hand geometry, iris, retina, scent, or voice.

11. The apparatus of claim 1, comprising:
a first camera operably coupled to the processor element;
the logic further to:
receive a first image captured from the first camera; and
determine a first one of the plurality of biometric measurements from the first image.

12. The apparatus of claim 11, the logic further to determine a second one of the plurality of biometric measurements from the first image.

13. The apparatus of claim 12, the logic further to:
receive a second image captured from the first camera;
determine whether the second image is captured within a threshold time of the first image; and
determine a second one of the plurality of biometric measurements from the second image based on the determination that the second image is captured within a threshold time of the first image.

14. The apparatus of claim 12, comprising:
a second camera operably coupled to the processor element;
the logic further to:
receive a second image captured from the second camera; and determine a second one of the plurality of biometric measurements from the second image.

15. The apparatus of claim 14, the logic to determine whether the first image and the second image are captured simultaneously.

16. At least one machine-readable storage medium comprising instructions that when executed by a computing device, cause the computing device to:
receive information including an indication of a plurality of biometric measurements, a first one of the plurality of biometric measurements corresponding to a first entity and a second one of the plurality of biometric measurements corresponding to a second entity; and
generate a combined biometric indicator based in part on the plurality of biometric measurements.

17. The at least one machine-readable storage medium of claim 16, the computing device caused to hash the plurality of biometric measurements to generate the combined biometric indicator.

18. The at least one machine-readable storage medium of claim 17, the computing device caused to hash the plurality of biometric measurements based on one or more fuzzy hashing techniques.

19. The at least one machine-readable storage medium of claim 16, the computing device caused to either store the combined biometric indicator as a combined biometric indicator key on a computer-readable storage.

20. The at least one machine-readable storage medium of claim 16, the computing device caused to:
determine whether the combined biometric indicator matches a combined biometric indicator key stored on a computer-readable storage; and
authenticate the combined biometric indicator based on the determination that the combined biometric indicator matches the combined biometric indicator key.

21. The at least one machine-readable storage medium of claim 16, the plurality of biometric measurements to include indications of a characteristic selected from the group consisting essentially of fingerprints, palm vein, face recognition, Deoxyribonucleic acid, palm print, hand geometry, iris, retina, scent, or voice.

22. A computer-implemented method comprising:
receiving information including an indication of a plurality of biometric measurements, a first one of the plurality of biometric measurements corresponding to a first entity and a second one of the plurality of biometric measurements corresponding to a second entity;
hashing the plurality of biometric measurements based on one or more fuzzy hashing techniques; and
generating a combined biometric indicator based in part on the hashed plurality of biometric measurements.

23. The computer-implemented method of claim 22, comprising:
determining whether the combined biometric indicator matches a combined biometric indicator key stored on a computer-readable storage; and
authenticating the combined biometric indicator based on the determination that the combined biometric indicator matches the combined biometric indicator key.

24. The computer-implemented method of claim 23, the plurality of biometric measurements to include indications of a characteristic selected from the group consisting essentially of fingerprints, palm vein, face recognition, Deoxyribonucleic acid, palm print, hand geometry, iris, retina, scent, or voice.

25. The computer-implemented method of claim 24, comprising:
receiving an indication of a first fingerprint captured from a fingerprint sensor;
receiving an indication of a second fingerprint captured from the fingerprint sensor; and
determining whether the indication of the second fingerprint is captured within a threshold time of the first fingerprint.

* * * * *